(12) United States Patent
Korotaev

(10) Patent No.: US 11,012,434 B2
(45) Date of Patent: *May 18, 2021

(54) METHOD FOR AUTOMATED AUTHENTICATION OF VOIP PHONE

(71) Applicant: Ingram Micro Inc., Irvine, CA (US)

(72) Inventor: Alexey Korotaev, Novosibirsk (RU)

(73) Assignee: INGRAM MICRO INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,799

(22) Filed: May 13, 2019

(65) Prior Publication Data

US 2019/0273735 A1 Sep. 5, 2019

Related U.S. Application Data

(63) Continuation of application No. 14/997,508, filed on Jan. 16, 2016, now Pat. No. 10,326,752.

(51) Int. Cl.
*H04L 29/06* (2006.01)
*H04M 7/00* (2006.01)

(52) U.S. Cl.
CPC .......... *H04L 63/0823* (2013.01); *H04L 63/08* (2013.01); *H04L 63/083* (2013.01); *H04L 63/166* (2013.01); *H04M 7/0078* (2013.01)

(58) Field of Classification Search
None
See application file for complete search history.

(56) References Cited

U.S. PATENT DOCUMENTS

| 8,406,421 B2 * | 3/2013 | Kamen | H04L 65/1053 380/28 |
| 2011/0302408 A1 * | 12/2011 | McDermott | H04L 65/104 713/153 |
| 2015/0347683 A1 * | 12/2015 | Ansari | H04L 9/30 726/7 |

* cited by examiner

*Primary Examiner* — Kambiz Zand
*Assistant Examiner* — Arezoo Sherkat
(74) *Attorney, Agent, or Firm* — Ice Miller LLP

(57) ABSTRACT

A method for automated authentication of a user VoIP phone supported by a Private Branch eXchange (PBX) configuration server is provided. A VoIP phone or a VoIP supported device is configured for an automated authentication by a vendor. The authentication method does not require manual entry of authentication data by a user. The unique VoIP phone authentication data can be provided by the vendor in a form of a MAC address. Additionally, the vendor can assign a digital certificate (containing public and private encryption keys) signed by the vendor to the VoIP phone. In this case, the VoIP phone vendor serves as a trusted authority. Thus, the VoIP phone automatically connects with the configuration server and the authentication transformation server (ATS) and the address where the VoIP phone sends the authentication data upon connection to the network is determined by the ATS.

10 Claims, 3 Drawing Sheets

METHOD FOR AUTOMATED AUTHENTICATION OF VOIP PHONE

CROSS REFERENCE TO RELATED APPLICATION

The present application is a continuation patent application, which claims the priority benefit of U.S. application Ser. No. 14/997,508 filed Jan. 16, 2016, the text and drawings of which are hereby incorporated in its entirety.

BACKGROUND OF THE INVENTION

Field of the Invention

The present invention relates to authentication of a phone, and more particularly, to a method and system for automated authentication of a user VoIP phone supported by a Private Branch eXchange (PBX) configuration server.

Description of the Related Art

The industry trend of using VoIP telephony presents some challenges with regard to automated authentication of a user VoIP device by a configuration server. One problem with automatic or pre-set configuration is security. Since such configuration typically contains a user's personal data and personal settings, a third party should not normally have access to it. This problem occurs when the end user receives his phone and connects for the first time to the Internet.

Most of the modern VoIP phones support protocols that allow for the phone to be automatically authenticated on a provider configuration server, which makes the authentication more efficient. It allows end users to only connect theirs phones to the Internet for receiving an almost-working and configured phone. However, not all of the configuration servers included into a PBX system for VoIP telephony support the automated authentication of the VoIP phones (or similar VoIP devices). Most of the configuration servers only support the manual login/password-based authentication. This type of authentication is inefficient and costly, since providers have to generate unique logins and passwords for each of the phones and provide the authentication data to a user over a secure communication channel and receive the authentication data back from the user, also over a secure channel. This takes up a lot of resources.

Currently, only complete replacement of the PBX can provide a transformation to a method for an automated authentication of user VOIP phones. However, replacing the PBX is often not an option due to very high costs of a configuration server and the entire PBX system. Accordingly, a convenient and efficient method for automated authentication of an VOIP phone supported by the PBX configuration server, which does not require replacement of the PBX system, is desired.

SUMMARY OF THE INVENTION

The present invention is related to a method and system for transformation authentication method of a user VoIP phone supported by a Private Branch eXchange (PBX) configuration server that substantially overcomes the disadvantages of the related art.

[In one aspect, a method is provided for automated authentication of a user VoIP phone that uses a Private Branch eXchange (PBX) configuration server and an ATS. A VoIP phone or a VoIP supported device (e.g., an application with access to a network USB adapter), which functions as a phone, is configured for an automated authentication by a vendor. The authentication method does not require manual entry of authentication data by a user. The unique VoIP phone authentication data can be provided by the vendor in a form of a MAC address. Additionally, the vendor can assign a digital certificate (containing public and private encryption keys) signed by the vendor to the VoIP phone. In this case, the VoIP phone vendor serves as a trusted authority.

Thus, the VoIP phone automatically connects with other network nodes, such as the configuration server and the authentication transformation server (ATS). The VoIP phone sends a handshake message and a public key along with the VoIP certificate to the ATS. After the public key is checked against the certificate, the communication session is established. In one embodiment, an asymmetric encryption and Transport Layer Security (TLS) protocol can be used, if the ATS and Private Branch eXchange (PBX) configuration server possesses private and public keys. The address where the VoIP phone sends the authentication data upon connection to the network is determined by the ATS.

Additional features and advantages of the invention will be set forth in the description that follows, and in part will be apparent from the description, or may be learned by practice of the invention. The advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the description of the invention.

DETAILED DESCRIPTION OF EMBODIMENTS OF THE INVENTION

Figure 1:
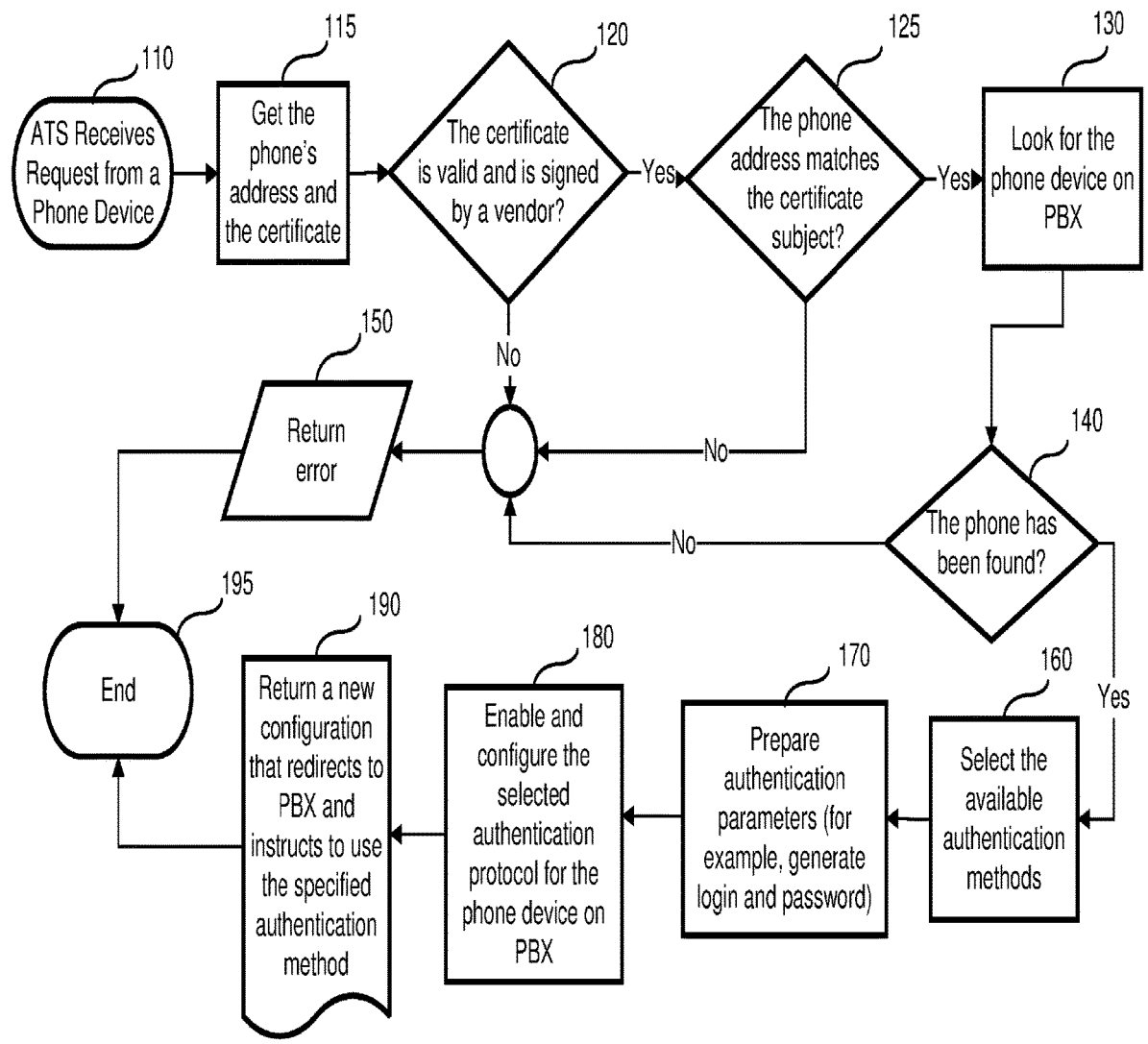
FIG. 1 illustrates a flow chart of an automated authentication method, in accordance with the exemplary embodiment.

Reference will now be made in detail to the embodiments of the present invention, examples of which are illustrated in the accompanying drawings.

In one aspect, a method for automated authentication of a user VoIP phone includes launching a provider's PBX including a configuration server; registering a VoIP phone in a database of the PBX by reading authentication data of the VoIP phones; embedding, into the VoIP phone, an address for sending authentication data of the VoIP phone; launching an authentication transformation server (ATS) hosting an authentication database; connecting the ATS to a configuration server hosting a configuration database; connecting the VoIP phone to the Internet; receiving authentication data from the VoIP phone, including the embedded address; checking a status of the VoIP phone in the database of the PBX; establishing a Transport Layer Security protocol connection to the VoIP phone, if the VoIP is "registered" with the PBX; identifying a model of the VoIP phone; determining authentication methods supported by the VoIP phone based on the model; searching the authentication database for an authentication method supported by both the VoIP phone and the configuration server; activating the supported authentication method; generating VoIP phone authentication parameters; sending the VoIP phone authentication parameters to the configuration server for authentication of the VoIP phone; and providing the new authentication parameters and the address of the configuration server to the VoIP phone for receiving new configuration parameters from the configuration database. The configuration parameters can include a real address of the configuration server and instructions for using a specified authentication method In other embodiments, a VoIP phone or a VoIP supported device (e.g., an application with access to a network USB adapter), which functions as a phone, is configured for an automated authentication by a vendor. The authentication method does not require manual entry of authentication data by a user. The unique VoIP phone authentication data can be provided by the vendor in a form of a MAC address. Additionally, the vendor can assign a digital certificate (containing public and private encryption keys) signed by the vendor to the VoIP phone. In this case, the VoIP phone vendor serves as a trusted authority.

Thus, the VoIP phone automatically connects with other network nodes, such as the configuration server and the authentication transformation server (ATS). The VoIP phone sends a handshake message and a public key along with the VoIP certificate to the ATS. After the public key is checked against the certificate, the communication session is established.

In one embodiment, an asymmetric encryption and Transport Layer Security (TLS) protocol can be used if the ATS and Private Branch eXchange (PBX) configuration server possesses private and public keys. The address where the VoIP phone sends the authentication data upon connection to the network needs to be provided ahead of time. This address has to be integrated inside the phone.

In one embodiment, the VoIP telephony provider provides to the vendor his configuration server address or the address of the ATS. Then, the vendor configures the phone (which are booked by the provider) accordingly. Then, the vendor sends authentication data of these phones to the provider. At this time, the VoIP phones are registered in the provider's PBX by reading off authentication data. Once the phone is positively authenticated it receives the mark "registered in the system." In one embodiment, the vendor explicitly "writes" the provider's configuration server or the ATS address into the phone at production. Alternatively, the vendor embeds the address of its own server into all the phones. This server plays a role of a distribution center, which contains a database with data reflecting which phones are booked by which providers, and to what corresponding addresses the authentication data is to be sent. Then, at first (initial) connection the phone is automatically redirected to the provider server (ATS or Private Branch eXchange (PBX) configuration server). This occurs only once at the first connection.

According to another exemplary embodiment, the address is embedded into the phone by the provider. The provider inserts the address right after it acquires the VoIP phone form a vendor, before it is sold to a user. This can be implemented by a direct connection of the VoIP phone to the provider's PBX having the address data. Alternatively, the address can be set by the provider via a web interface or it can be written into a user guide. At the same time, the VoIP phone is registered in the provider's PBX by reading off its authentication data. Once the phone is positively authenticated it receives the mark "registered in the system."

According to yet another embodiment, a user can acquire the VoIP phone directly from a manufacturer (i.e., vendor). Then, the user connects to provide over a secure channel and selects a service rate. The user signs a service agreement and provides phone's authentication data to the provider—i.e., registers his phone with the provider. The user receives an address form the provider, where the VoIP phone upon connecting to the network will send its authentication data for its configuration. Based on data received from the provider, the user enters into his phone settings an address of the authentication transformation server where authentication data is going to be sent automatically.

According to the exemplary embodiment, an authentication transformation server (ATS) and a configuration server on the provider side are used. Unlike the ATS, the configuration server is a part of the PBX provider. The ATS can be implemented as hardware/software system (e.g., an FTP server) having a secure connection to a database of the configuration server. The ATS can be implemented, for example, as a cloud server. The ATS hosts a database containing data about existing phone models and authentication methods supported by each of the models.

The database also contains data reflecting a method of authentication supported by the configuration server. Additionally, the ATS should support a wide range of authentication methods and at least a default method of the given VoIP phone. Other authentication methods can use the Kerberos scheme, various types of digest authentications, SSO-based protocols (e.g., SAML, OpenID, WS-Federation), one-time passwords and/or hardware tokens, biometrics, and proximity-based authentication.

As discussed above, the address for authentication is embedded into the VoIP phone in order to send the authentication data to this address over the Internet at the initial connection of the phone. In case the provider knows ahead of time that its authentication method supported by the configuration server is incompatible with the method supported by the VoIP phone, the address of the ATS is embedded into the VoIP phone by the provider as described above, or by vendor, as also described above.

If the provider does not know ahead of time which authentication methods are supported, a special authentication indicator is mounted inside the configuration server. The authentication indicator monitors the authentication process, and if an error occurs between the phone and the configuration server, the phone authentication data is sent to the ATS. The ATS performs the following actions:

receives the authentication data from the VoIP phone (or from the authentication indicator responsible for redirecting the data in case of an error);
    checks the phone status on the provider's PBX (i.e., checks for "registered in the system" marker);
    sets up communication with the VoIP phone over TLS protocol;
    determines authentication methods supported by the phone using the database;
    searches for the authentication method supported by both the phone and the configuration server;

activates a supported authentication method (e.g., activation authentication by a login/password and generation of a unique login/password pair for the phone);

sends the generated authentication data to the configuration server for authentication of the phone; and returns new authentication data and a real address of the configuration server to the VOIP phone.

A flow chart of an automated authentication method is depicted in FIG. 1. A user connects his VoIP device (i.e., a phone) to the Internet. The phone automatically sends its authentication to the ATS. In step 110, the ATS receives authentication request from the VoIP device. The request includes a handshake and his public key along with the VoIP certificate by the vendor. In step 115, the ATS receives the phone's address and certificate and checks if the certificate is valid in step 120. If the certificate is invalid, the ATS returns the error to the phone in step 150. Otherwise, the ATS checks if the phone address (or public key) matches the certificate in step 125. If the address does not match the certificate, the ATS returns the error to the phone in step 150. Otherwise, the ATS searches for the phone in the PBX database in step 130.

If the phone is not found in step 140, the ATS returns the error to the phone in step 150. Otherwise, the ATS selects available authentication methods in step 160. Then, in step 170 the ATS prepares authentication parameters (e.g., generates a unique login/password pair). In step 180, the ATS enables and configures the selected authentication protocol for the phone in the PBX server. In step 190, the ATS returns a new configuration to the phone. The new configuration redirects authentication data to the PBX configuration server and instructs the server to use a specific authentication method. The authentication process ends in step 195.

Figure 2:
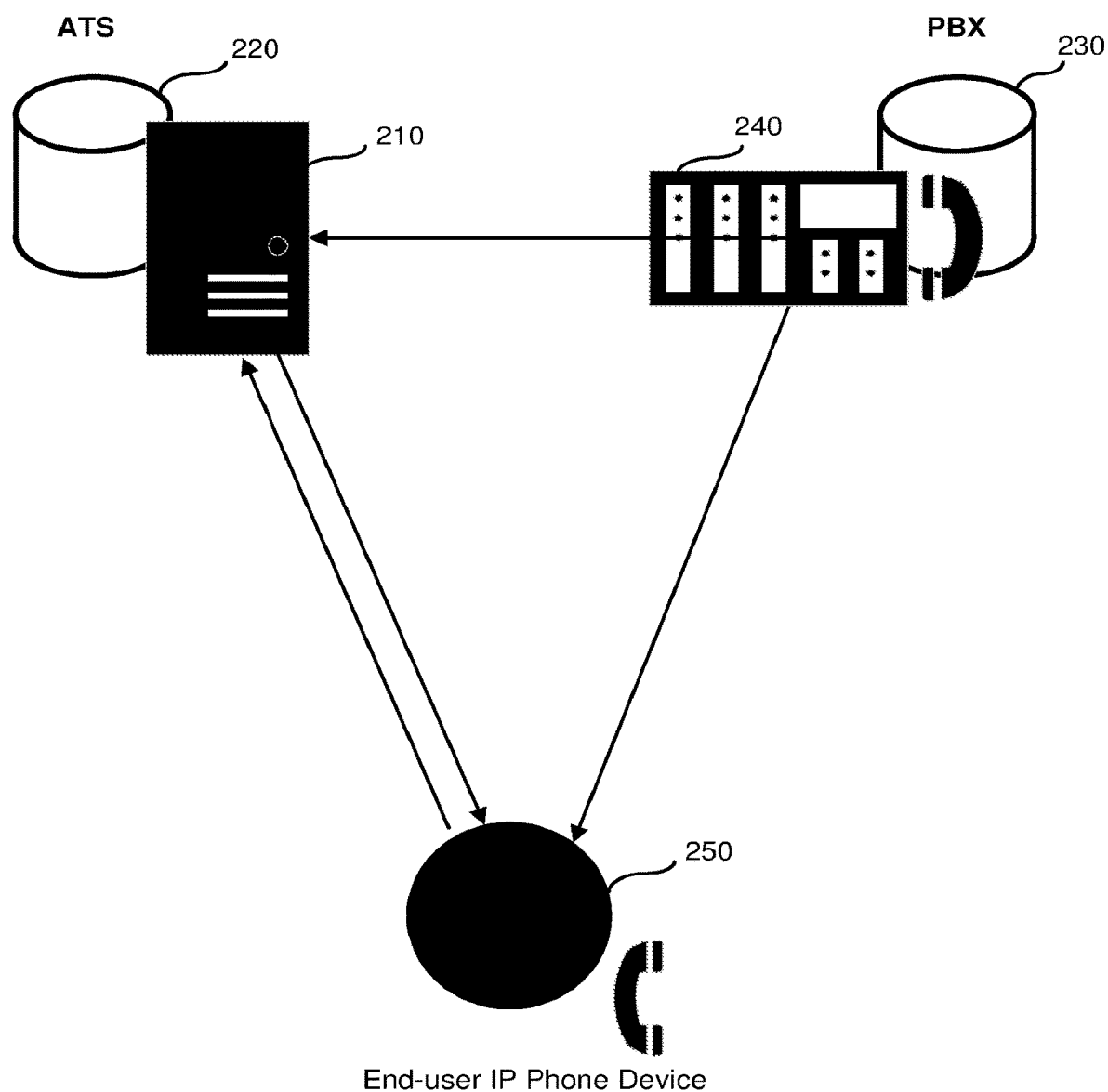
FIG. 2 illustrates a system architecture used for automated authentication of the VOIP phone device, in accordance with the exemplary embodiment.

FIG. 2 illustrates a system architecture used for automated authentication of the VoIP phone device, in accordance with the exemplary embodiment. An ATS 210 checks the status of the VoIP phone 250 with the acquired authentication data in the provider's PBX system 230. If the marker "registered in the system" is found in the PBX database, the ATS 210 establishes a connection with the phone by sending its public key using TLS protocol. The ATS 210 acquires the VoIP phone 250 model data. The ATS 210 searches for available authentication methods for this model in the ATS database 220. The ATS 210 selects one of available authentication methods from the ATS database 220. For example, the ATS 210 activates login/password pair unique for the phone device 250. Alternatively, the ATS can configure an LDAP catalog (i.e., for example, Active Directory) to authenticate the VoIP phone with the certificate (create a user and enable the certificate-based authentication) and switch authentication between the PBX and the VoIP phone to the Kerberos scheme or some federation-based authentication (for example WS-Federation).

The ATS 210 provides generated login/password pair to the provider's PBX with the mark "registered in the system" corresponding to the phone authentication parameters stored in the provider's PBX. The ATS 210 emulates the PBX configuration server 240 and returns to new configuration to the phone 250. This configuration includes an address of a real PBX configuration server 240 as a new address for loading configuration parameters. The configuration also includes a new type of authentication and new authentication parameters (e.g., login/password).

The user phone device 250 connects to the configuration server 240 and authenticates itself using the authentication method and parameters provided by the ATS 210. The configuration server checks the authentication parameters and status of the phone 250 against the PBX database 230. If the marker "registered in the system is found," the configuration server 240 provides the new configuration to the phone device 250.

Figure 3:
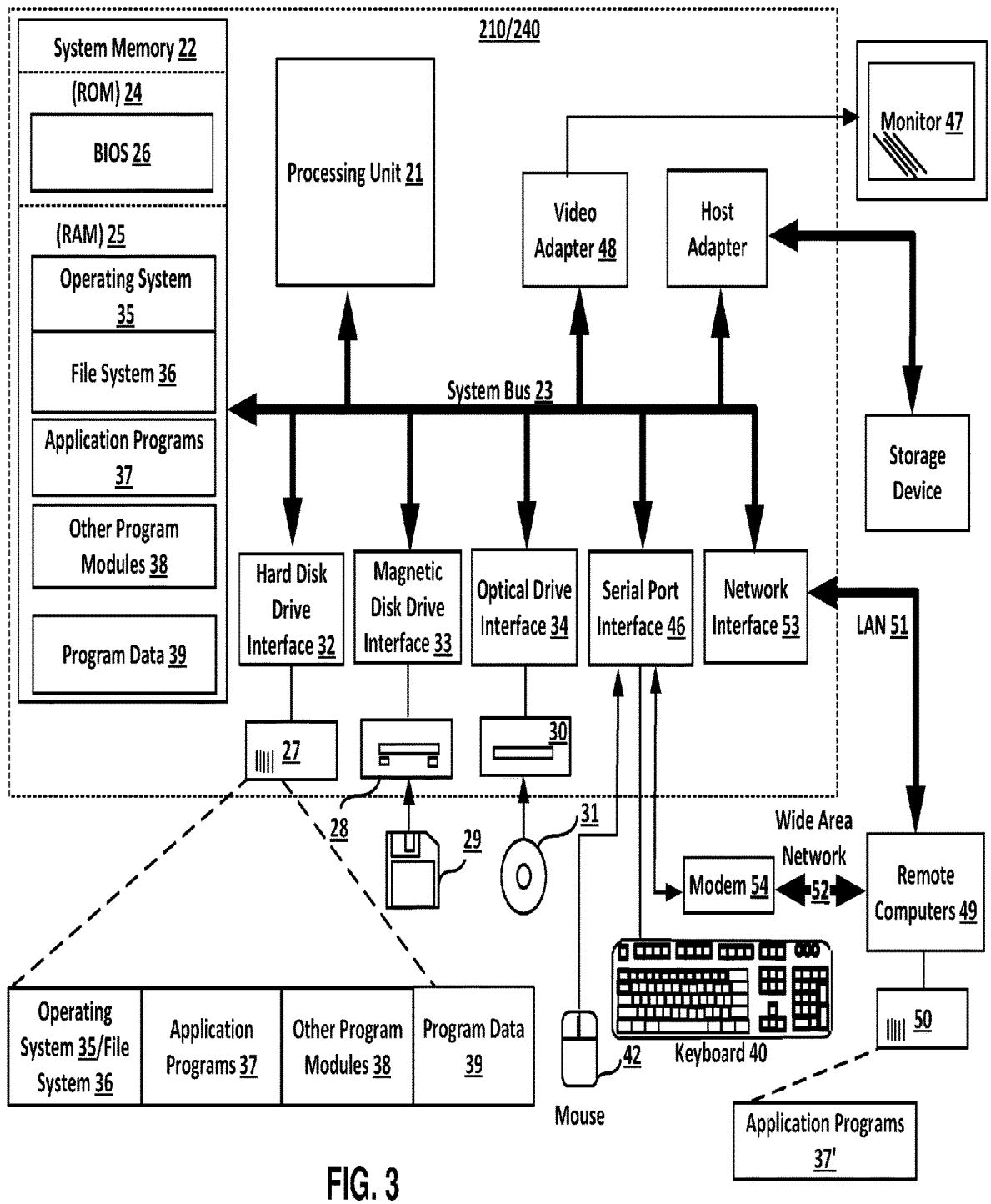
FIG. 3 illustrates an exemplary server used for implementing the invention.

With reference to FIG. 3, an exemplary system for implementing the invention includes a general purpose computing device in the form of a host computer or server 210/240 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 210/240, such as during start-up, is stored in ROM 24. The host computer 210/240 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the host computer 210/240.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 210/240 includes a file system 36 associated with or included within the operating system 35, such as the WINDOWS NT™ File System (NTFS), one or more application programs 37, other program modules 38 and program data 39. A user may enter commands and information into the personal computer 210/240 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other perVoIPheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The server 210/240 may operate in a networked environment using logical connections to one or more remote computers 49. The remote computer (or computers) 49 may be another personal computer, a server, a router, a network PC, a peer device or other common network node, and typically includes many or all of the elements described above relative to the server 210/240.

The server (host) 210/240 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer/host 110 is connected to the local area network 51 through a network interface or adapter 53. When used in a WAN networking environment, the personal computer 210/240 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer or server 210/240, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for automated authentication of a Voice over Internet Protocol (VoIP) phone,
the method comprising:
   launching a provider's Private Branch eXchange (PBX) including a configuration server,
   registering the VoIP phone in a database of the provider's PBX by reading authentication data of the VoIP phone;
   embedding, into the VoIP phone, an address for sending the authentication data of the VoIP phone;
   launching an authentication transformation server (ATS) hosting an authentication database;
   connecting the ATS to the configuration server hosting a configuration database;
   connecting the VoIP phone to the Internet;
   receiving authentication data from the VoIP phone, including the embedded address;
   checking a status of the VoIP phone in the database of the PBX;
   establishing a Transport Layer Security protocol connection to the VoIP phone, if the VoIP phone is "registered" with the PBX;
   identifying a model of the VoIP phone;
   determining authentication methods supported by the VoIP phone based on the model;
   searching the authentication database for an authentication method supported by both the VoIP phone and the configuration server,
   activating the supported authentication method;
   generating VoIP phone authentication parameters;
   sending the VoIP phone authentication parameters to the configuration server for authentication of the VoIP phone; and
   providing the authentication parameters and the address of the configuration server to the VoIP phone for receiving configuration parameters from the configuration database,
   wherein the configuration parameters include an address of the configuration server and instructions for using a specified authentication method.

2. The method of claim 1, further comprising, receiving the authentication data from the VoIP phone by the ATS and generating the VoIP phone authentication parameters by the ATS.

3. The method of claim 1, further comprising:
   receiving, by the ATS, a public key of the VoIP phone and a certificate by a vendor of the VoIP phone; and
   checking validity of the certificate and checking if the certificate matches the public key prior to the checking of the status of the VoIP phone on the provider's PBX, if the certificate is valid.

4. The method of claim 1, wherein the authentication parameters include a login-password pair.

5. The method of claim 1, wherein the ATS is a cloud server.

6. The method of claim 1, wherein the address for sending the authentication data of the VoIP phone are embedded into the VoIP phone by the provider.

7. The method of claim 1, wherein the address for sending the authentication data of the VoIP phone is embedded into the VoIP phone by a manufacturer of the VoIP phone.

8. The method of claim 1, wherein the address for sending the authentication data of the VoIP phone is embedded into the VoIP phone by a vendor of the VoIP phone.

9. The method of claim 1, wherein the VoIP phone address is a MAC address.

10. A method for automated authentication of a Voice over Internet Protocol enabled (VoIP-enabled) device, the method comprising:
   registering the VoIP-enabled device in a database of a native Private Branch eXchange (PBX);
   embedding, into the VoIP-enabled device, an address for sending authentication data of the VoIP-enabled device;
   connecting a third party server to a native Private Branch eXchange (PBX) configuration server;
   receiving the authentication data from the VoIP-enabled device into the third party server, establishing a connection to the VoIP-enabled device, if the VoIP-enabled device is registered with a provider;
   determining authentication methods supported by the VoIP-enabled device based on its model, and searching an authentication database for an authentication method commonly supported by both the VoIP-enabled device and the native PBX configuration server;
   generating VoIP-enabled device authentication parameters and providing the authentication parameters to the native PBX configuration server;
   providing the authentication parameters and the address of the native PBX configuration server to the VoIP-enabled device for configuration of the VoIP-enabled device.

* * * * *